United States Patent
Kimura et al.

(10) Patent No.: US 7,965,610 B2
(45) Date of Patent: Jun. 21, 2011

(54) OPTICAL PICKUP DEVICE

(75) Inventors: Shigeharu Kimura, Yokohama (JP);
Harukazu Miyamoto,
Higashimurayama (JP)

(73) Assignee: Hitachi Media Electronics Co., Ltd.,
Iwate-ken (JP)

( * ) Notice: Subject to any disclaimer, the term of this patent is extended or adjusted under 35 U.S.C. 154(b) by 37 days.

(21) Appl. No.: 12/632,867

(22) Filed: Dec. 8, 2009

(65) Prior Publication Data
US 2010/0142354 A1 Jun. 10, 2010

(30) Foreign Application Priority Data
Dec. 9, 2008 (JP) ................................ 2008-313707

(51) Int. Cl.
*G11B 7/00* (2006.01)

(52) U.S. Cl. ......... 369/112.03; 369/112.01; 369/112.16; 369/112.22; 369/44.23; 369/44.25

(58) Field of Classification Search ............ 369/112.01, 369/112.03, 112.16, 112.22, 44.23, 44.24
See application file for complete search history.

(56) References Cited

U.S. PATENT DOCUMENTS

| | | | |
|---|---|---|---|
| 2007/0104072 A1* | 5/2007 | Ogata | 369/112.16 |
| 2007/0268807 A1* | 11/2007 | Kimura et al. | 369/112.16 |
| 2008/0127238 A1* | 5/2008 | Kimura et al. | 720/659 |
| 2008/0267019 A1* | 10/2008 | Kimura et al. | 369/44.12 |
| 2009/0016180 A1 | 1/2009 | Kimura et al. | |
| 2009/0103106 A1 | 4/2009 | Kimura et al. | |

FOREIGN PATENT DOCUMENTS

| | | | |
|---|---|---|---|
| JP | 2002367211 A | * | 12/2002 |
| JP | 2005302084 A | * | 10/2005 |

OTHER PUBLICATIONS

Hartmut Richter et al.; System Aspects of Dual-Layer Phase-Change Recording with High Numerical Aperture Optics and Blue Laser; Japan Journal Applied Physics; Feb. 2003; pp. 956-960; vol. 42, Part 1, No. 2B.

Shigeharu Kimura et al.; Use of grating in reading multi-layer disc to reduce amount of interlayer cross-talk; ISOM/ODS, Technical Digest Post-deadline Papers, TD05-155; 2008; pp. 1-3; central Research Laboratory, Hitachi, Ltd. 1-280, Higashi-koigakubo, Kokubunji 185-8601, Japan.

* cited by examiner

*Primary Examiner* — Wayne R Young
*Assistant Examiner* — Latanya Bibbins
(74) *Attorney, Agent, or Firm* — Antonelli, Terry, Stout & Kraus, LLP.

(57) ABSTRACT

In an optical pickup capable of removing inter-layer crosstalk, a dark line that may appear in a central portion of a beam is removed. Thereby, an error in a data signal is reduced. Reflected light from a multi-layer disc is split into two parallel bundles with a splitting optical system in a way that the light is split at a central line. Thereby, when reflected light from a target layer is focused, the reflected light is not influenced from an attenuation element provided on an optical axis.

10 Claims, 13 Drawing Sheets

OPTICAL PICKUP DEVICE

CLAIM OF PRIORITY

The present application claims priority from Japanese patent application JP 2008-313707 filed on Dec. 9, 2008, the content of which is hereby incorporated by reference into this application.

BACKGROUND OF THE INVENTION

1. Field of the Invention

The present invention relates to an optical pickup device, and particularly to a reading optical system of an optical pickup device.

2. Description of the Related Art

The recording capacity of a single layer in an optical disc largely depends on the wavelength of a semiconductor laser to be used and the numerical aperture (NA) of an objective lens. The shorter the wavelength of a semiconductor laser or the larger the NA, the higher the recording density can be made. Thus, the capacity of an individual layer can be increased. The principal optical disc drives currently on the market are DVD (Digital Versatile Disc) drives that use red light with a wavelength near 650 nm and an objective lens with an NA of 0.6. Meanwhile, an optical disc drive having a recording density higher than that of a DVD drive is also delivered on the market. Such an optical disc drive uses a blue-violet semiconductor laser with a wavelength near 405 nm as a light source and an objective lens with an NA of 0.85. A conceivable way to further increase recording density beyond the recording density currently achieved is to further shorten the wavelength to be used. However, it is expected to be difficult to develop such a semiconductor laser of the ultraviolet region, which is of wavelengths shorter than those of the blue-violet region. Moreover, with regard to increasing the NA of an objective lens, the improvement in recording density by means of increasing the NA of an objective lens is also difficult because the NA of the objective lens in air is 1 at most.

In such a circumstance, a double-layer structure has been employed as a way to increase the capacity of a single optical disc. Non-Patent Document 1 proposes a technique of a double-layer phase-change disc. When a double-layer optical disc is irradiated with a laser beam, a problem of crosstalk between layers arises, because adjacent layers are irradiated simultaneously with the laser beam. A measure having been taken to suppress this problem is to increase an interval between layers. Since a laser beam is focused on a layer intended to be irradiated (hereinafter, a target layer), the focal position of the laser beam deviates from a layer other than the target layer. Thereby, the crosstalk can be reduced.

However, increase in the inter-layer interval leads to the problem of spherical aberration. A recording layer is embedded within a polycarbonate material having a refractive index different from that of the air. The spherical aberration varies depending on the depth from the disc surface. An objective lens is designed in a way that its spherical aberration is made small only for a particular layer. Accordingly, spherical aberration increases when the focal point of a laser beam is shifted to another layer. This is because the distance from the disc surface to the focal position is different between the layers. This aberration can be corrected by setting an expander lens optical system usually formed of two lenses or a liquid crystal element in front of the objective lens. Specifically, the aberration can be corrected by changing the distance between the two lenses or the phase of the liquid crystal element. However, it is difficult to correct large spherical aberration, in view of the range of spherical aberration compensable by the liquid crystal element or the need to realize a lens moving mechanism within a small-sized optical disc drive apparatus.

When a multi-layer structure is employed to increase the recording capacity, a larger number of layers should be placed at narrower intervals because the correctable limit of spherical aberration restricts the total thickness of the multiple layers. For this reason, a problem of inter-layer crosstalk remains in a practical optical drive apparatus for multilayer optical discs.

In order to reduce such crosstalk, Non-Patent Document 2 describes the use of a feature in which, when reflected light from a multi-layer optical disc is focused by a lens, the focal positions of reflected light beams from a target layer and an adjacent layer thereof are different from each other on an optical axis. Specifically, a grating is disposed in such a manner as to include the optical axis, and a reflecting mirror is disposed at the focal position of the reflected light beam from the target layer. The reflected light beam from the adjacent layer irradiates the grating, and accordingly is attenuated. Meanwhile, the reflected light beam from the target layer is transmitted through a gap between the grating and the reflecting mirror, and accordingly can return to a detection system without being attenuated. In this manner, the inter-layer crosstalk can be reduced.

[Non-Patent Document 1] Jpn. J. Appl. Phys. Vol. 42 (2003) pp. 956-960

[Non-Patent Document 2] ISOM/ODS' 08, Technical Digest Post-deadline Papers, TD05-155 (2008)

SUMMARY OF THE INVENTION

With reference to FIG. 3, crosstalk caused by a multi-layer optical disc in a detection optical system of an optical pickup device will be described. It is assumed here that a DPP (Differential Push-Pull) method is used for detection of a tracking error signal. In the DPP method, an optical disc is irradiated with three light beams that are formed by splitting a laser beam into one main light beam and two sub-light beams with a diffraction grating. In FIG. 3, only a main light beam 80 is shown. For simplification, reference numeral 501 denotes a double-layer optical disc, and reference numerals 511 and 512 denote information recording layers. A minimum beam spot position of the main light beam from an objective lens 401 is located on the information recording layer 511, as shown by the main light beam 80, with which information is to be read from the information recording layer 511. On the information recording layer 511, guide grooves for tracking are formed as shown in FIG. 4. The main light beam 80 irradiates one of the grooves and forms an optical spot 94, and simultaneously, the sub-light beams irradiate positions each deviated from the one groove by a half track pitch and form irradiation spots 95, 96, respectively. Since the irradiated light is focused on the recording layer 511, its reflected light returns to the objective lens 401 in FIG. 3 by traveling backward along the same optical path as the incident light has passed. Next, the reflected light is transmitted through a detection lens 402 and enters a photodetector 51 as an optical beam 801. The detection lens 402 has astigmatism, and the photodetector 51 is provided at the position of the least circle of confusion.

FIG. 5 shows the shape of the photodetector 51 and an incident condition of the reflected light from the optical disc. A 4-split detector 541 is located at the center while being split into four square sections. This detector 541 is provided to detect a main light beam, and the main light beam irradiates the detector 541 and forms a spot 811. The reflected light beams of the sub-light beams enter 2-split detectors 542, 543 and form optical spots 812, 813, respectively. The signals from the 4-split detector 541 are defined as signals A, B, C and D, while the signals from the 2-split detector 542 are defined as signals E and F and the signals from the 2-split detector 543 are defined as signals G and H. In this case, a tracking error signal TR is expressed as TR=(A+B)−(C+D)−k{(E−F)+(G−H)}. Here, k is a constant determined by, for example, the intensity ratio between the main light beam and the sub-light beams. Usually, the main light beam is set to have intensity higher by 10 times or more than that of the sub-light beam. Moreover, when a focus error signal is defined as AF and a data signal is defined as RF, these signals are respectively expressed as AF=A+C−(B+D) and RF=A+C+B+D. The TR and AF signals are used to control the irradiation position of a laser beam.

A multi-layer disc is designed in a way that, when the disc is irradiated with a laser beam, the quantity of reflected light from one layer is almost equal to that from the other layers. Accordingly, the layer closer to the objective lens has a greater transmittance, enabling the irradiation of a layer farther from the objective lens with the laser beam. Under this condition, when laser light is focused on the target layer 511 for information reading as shown in FIG. 3, a part of the laser light is transmitted through the target layer 511 as an optical beam 82, reflected by the adjacent layer 512 resulting in a reflected light beam 83 which is stray light. This reflected light beam 83 returns to the objective lens 401 and enters the detection lens 402. Then, once focused in front of the photodetector 51, the reflected light beam 83 enters the photodetector 51 while spreading as an optical beam 804 shows. The optical beam 804 forms an optical spot 841 spread on the surface of the photodetector as shown in FIG. 5, covering the photodetectors 541, 542, and 543. Thereby, this optical spot 841 interferes with the beams 811, 812, and 813. This interference is influenced and varies with the change in phase of the optical spot 841 due to variation in the inter-layer interval.

Variation in the RF signal intensity that is the total quantity of the beam 811 causes jitter deterioration of the RF signal, which deteriorates the error rate at the time of data reading. Moreover, the interference with the beams 812 and 813 causes variation in the TR signal. The intensity of sub-light beams formed by splitting laser light with the diffraction grating is designed to be low. Accordingly, this intensity level is almost identical to the power density level of the main light beam reflected from the adjacent layer, and thereby the effect of the interference distinctly appears. This interference is also influenced by the inclination, layer interval, and the like of an optical disc. Thus, the distribution in quantity of light at the optical spot 812 or 813 is changed with rotation of a disk having a non-uniform layer interval. As a result, the differential signal part (E−F)+(G−H) of the TR signal is influenced, and thereby the tracking signal is unbalanced. In this manner, a failure such as a tracking error may occur. Similarly, even in a case when an adjacent layer 512 is located closer to the objective lens than a reading target layer 511, light is also reflected by the adjacent layer 512, resulting in a similar problem of interference.

In order to reduce the above-described inter-layer crosstalk that is caused by the adjacent layer, in Non-Patent Document 1, a grating element 46 is used in a pickup optical system shown in FIG. 6. Hereinafter, the optical system will be described. Laser light emitted from a semiconductor laser 101 is converted into a circularly collimated optical beam with a collimator lens 403 and a triangular prism 102. The collimated beam is split into three beams with a diffraction grating 103, thus forming one main light beam and two sub-light beams. The travelling direction of the main light beam is identical to that of the incident beam, while the sub-light beams become emitted light beams which incline to some degree on both sides of the optical axis. Usually, the main light beam is set to have the quantity of light larger by 10 times or more than that of the sub-light beam. The three beams are transmitted through a polarized beam splitter 104, circularly polarized with a quarter wave plate 105, and then focused by an objective lens 404 on a multi-layer disc 501 that is rotated with a rotating mechanism. Here, a double-layer disc is shown as the multi-layer disc 501, but this optical system is also applicable to multi-layer discs of three or more layers. A reading target layer (target layer) is denoted by reference numeral 511, and the position of a minimum spot of the resultant laser beam is located on the reading target layer 511. A reflected light beam 83 is also generated from the laser beam being reflected from an adjacent layer 512 and becomes stray light that causes crosstalk.

Reflected light, including the stray light, from the multi-layer disc 501 returns to the objective lens 404, and the quarter wave plate 105 converts the reflected light to light linearly polarized in a direction orthogonal to the original polarizing direction. Thereby, the linearly polarized light is reflected by the polarized beam splitter 104 and then goes to a quarter wave plate 106 for conversion into circularly polarized light. Thereafter, the circularly polarized light is focused by a reflected light focusing lens 405. Then, the reflected light beam from the recording layer 511, that is the target layer, is reflected by a reflection plate 43 placed at a minimum spot position of the target layer. Between the reflected light focusing lens 405 and the reflection plate 43, the flat grating element 46 is provided in such a way as to include the optical axis. This grating element does not allow the reflected light beam from the adjacent layer 512 to return to the reflected light focusing lens 405. Meanwhile, the reflection plate 43 reflects the reflected light from the target layer 511, which then returns to the reflected light focusing lens 405. The quarter wave plate 106 converts the reflected light to light linearly polarized in a direction orthogonal to the polarized direction at the time of entering. Then, the linearly polarized light is transmitted through the beam splitter 104. Reference numeral 406 denotes a focusing lens having astigmatism, and a photodetector 52 is placed at the position of least circle of confusion. The shapes of light-sensing portions of the photodetector 52 are the same as those shown in FIG. 5. A signal from the photodetector 52 is processed with a signal processing circuit 53 to form an AF signal and a TR signal for controlling the position of an optical spot and form an RF signal as a data signal.

As shown in FIG. 7, when the adjacent layer that causes stray light is located deeper than the target layer, a reflected light beam 84 from the adjacent layer irradiates the grating element 46 on the optical axis at its minimum spot position 840 and accordingly is attenuated. Meanwhile, when the adjacent layer is located shallower than the target layer, as shown in FIG. 8, a reflected light beam from the adjacent layer is first reflected by the reflection plate 43, then irradiates the grating element 46 at its minimum spot position 850, and accordingly is attenuated. On the other hand, a reflected light beam from the target layer is transmitted through a gap between the grating 46 and the reflection plate 43, and accordingly is not attenuated. Since the quantity of the reflected light from the adjacent layer is reduced on the photodetector 52, inter-layer crosstalk is reduced.

However, in practice, a flat attenuation element such as a grating provided on the optical axis is never infinitely thin, and has a finite thickness. In FIG. 9 showing a light beam 86 near the optical axis, the light beam 86 is blocked by an attenuation element 47 having a finite thickness. In this way, a light beam on the optical axis and a light beam near the optical axis, of reflected light from the target layer, are blocked by the attenuation element. FIG. 10 shows distributions in quantity of light on the photodetector for reflected light beams from the target layer which are blocked by the attenuation element. A dark line 821 is formed in the main light beam, and dark lines 822, 833 are formed in the sub-light beams. A problem occurs particularly from the dark line 821 in the main light beam. The dark line 821 reduces the quantity of light, and thus reduces the signal-to-noise ratio of the RF signal. Consequently, the jitter value is deteriorated.

An object of the present invention is to provide an optical pickup device which prevents reduction in the signal-to-noise ratio of an RF signal that occurs when inter-layer crosstalk is reduced by adopting the above-described method of providing an attenuation element, so as not to deteriorate the jitter value of the RF signal.

In order to solve the above-described problems, the present invention adopts a method to prevent forming of a dark line in reflected light from a target layer.

An optical pickup device according to the present invention includes: a laser light source; an irradiated light focusing optical system for focusing laser light from the laser light source on a recording layer of a multi-layer optical information storage medium; and a detection optical system for detecting, among reflected light, light reflected from the recording layer of the multi-layer optical information storage medium. The detection optical system includes: a splitting optical system for splitting the reflected light from the recording layer into parallel light bundles; a reflected light focusing lens for focusing the reflected light thus split; a reflection surface placed at a minimum spot position of the reflected light from the target recording layer among the reflected light focused by the reflected light focusing lens; an attenuation element provided between the reflected light focusing lens and the reflection surface and used for attenuating the quantity of reflected light from a layer other than the target recording layer; and a photodetector for detecting the reflected light, and the reflected light reflected by the reflection surface is detected on the photodetector.

Alternatively, in an optical pickup device according to the present invention, a beam splitter and an objective lens are provided in an optical path of the irradiated light focusing optical system, the irradiated light focusing optical system and the detection optical system share the beam splitter and the objective lens, and the irradiated light focusing optical system allows the laser light from the laser light source to pass through the beam splitter as divergent light. The detection optical system includes: a splitting optical system for splitting the reflected light from the recording layer into light bundles respectively located on two sides of an optical axis so that the light bundles do not pass through the optical axis immediately after the splitting and gradually converge on the optical axis; a reflection surface provided at a minimum spot position of the reflected light from the target recording layer among the reflected light having passed through the splitting optical system; an attenuation element provided between the splitting optical system and the reflection surface in such a way as to include the optical axis and used for attenuating the quantity of reflected light from an adjacent layer other than the recording layer; and a photodetector for detecting the reflected light, and the reflected light reflected by the reflection surface is detected on the photodetector.

The attenuation element is provided in such a way as to include the optical axis, and to overlap at least one of minimum spot positions at which reflected light beams from other layers are focused by the reflected light focusing lens. The attenuation element plays a role of not returning the reflected light from the other layers to the reflected light focusing lens.

EFFECT OF THE INVENTION

According to the present invention, a dark line is no longer formed in a central portion of a main light beam of reflected light from a target layer, accordingly reducing light quantity loss. Thus, the jitter of an RF signal is reduced. Consequently, the reliability of read data is improved.

DESCRIPTION OF THE PREFERRED EMBODIMENTS

Figure 11:
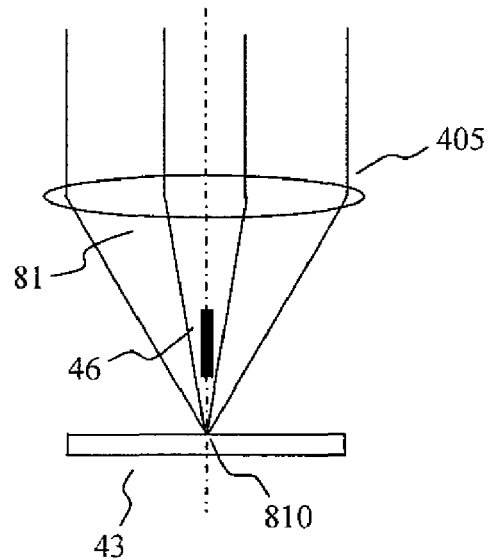
FIG. 11 shows a state where, when parallel split light that is reflected light from a target layer is focused by a reflected light focusing lens, the parallel split light is focused on a reflection plate while avoiding an attenuation element provided on an optical axis.

The role of a splitting optical system will be described with reference to FIG. 11. Reflected light from a multi-layer disc is split right and left with a splitting optical system and enters a reflected light focusing lens 405, but only reflected light from a target layer is shown in FIG. 11. The reflected light from the target layer enters in the state of being split into parallel beams. When focused by the reflected light focusing lens 405, these beams travel to a reflection plate 43 with no light traveling at the central portion, and form a minimum spot on the reflection plate. After being reflected, the reflected light returns to the reflected light focusing lens 405 in the state of being split into two beams, and these beams become two separate parallel light beams. A flat attenuation element 46 is provided on the optical axis in such a focusing state, and thus the attenuation element 46 never blocks the reflected light from the target layer. The attenuation element 46 can be formed of a light absorber or a grating element.

Figure 12:
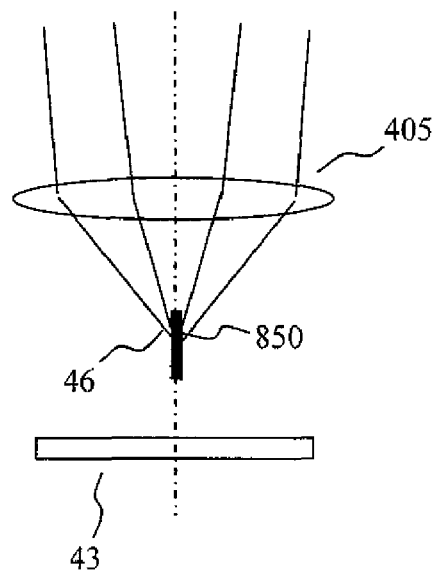
FIG. 12 shows a state where reflected light from a layer located deeper than the target layer and having been transmitted through a splitting element is focused on the attenuation element with a reflected light focusing lens.
Figure 13:
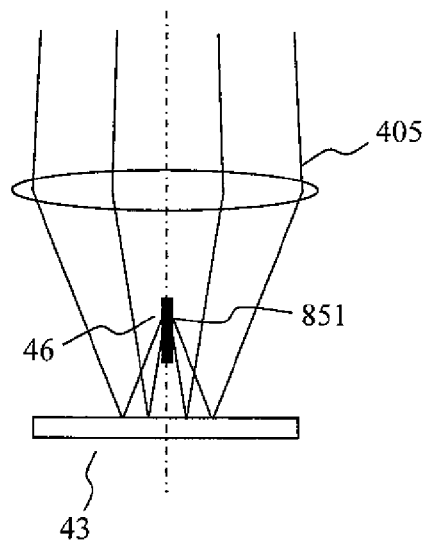
FIG. 13 shows a state where reflected light from a layer located shallower than the target layer and having been transmitted through the splitting element is focused on the attenuation element and the reflection plate by the reflected light focusing lens.

In FIG. 12, after reflected light from a layer located deeper than the target layer is split into two beams, the beams are focused by the reflected light focusing lens 405. Since the two beams are focused on a position designated by 850 on the attenuation element, the quantity of light is reduced with the attenuation element, and the beams do not return to the reflected light focusing lens 405. FIG. 13 shows a state where reflected light beams from a layer located shallower than the target layer enter the reflected light focusing lens 405 and are focused. In this case, the light beams are first reflected by the reflection plate 43, and then focused on a position 851 on the attenuation element 46. Accordingly, as in the case of FIG. 12, the quantity of light is reduced with the attenuation element 46, and the light beams do not return to the reflected light focusing lens. As has been described above, reflected light from the target layer can return to the reflected light focusing lens without hitting against the attenuation element; thus, the quantity of light is not reduced, and the jitter of an RF signal is not deteriorated. Moreover, as to inter-layer crosstalk, reflected light from the adjacent layer is reduced by the attenuation element. Accordingly, variation in a TR signal is eliminated, and thus the jitter of an RF signal is not deteriorated by the variation.

Figure 14:
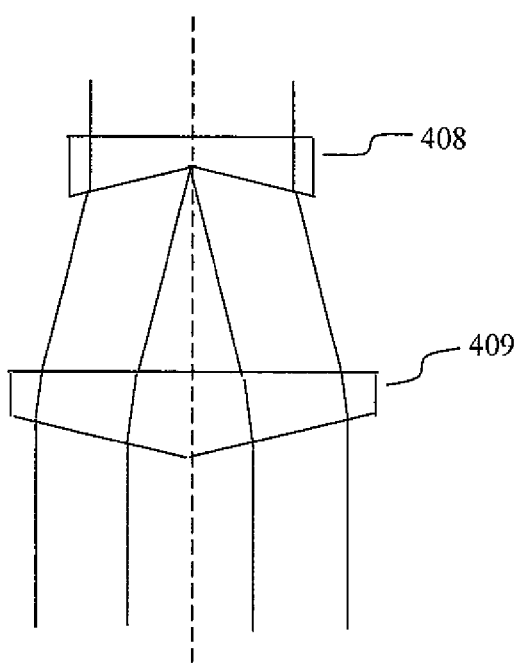
FIG. 14 shows a splitting optical system using two biprisms.

Next, the splitting optical system will be described. FIG. 14 shows an example of a splitting optical system that splits a beam using two biprisms. Parallel light beams enter a first biprism 408, and form parallel light beams respectively traveling in directions, which have the same angles to the optical axis and which are symmetrical about the optical axis, while the perpendicular line of the optical axis serves as the dividing line. A second biprism 409 changes the traveling directions of the parallel light beams having the angles to the optical axis into a direction parallel to the optical axis. By using such two biprisms, normal beams can be converted into parallel split light beams.

Figure 15:
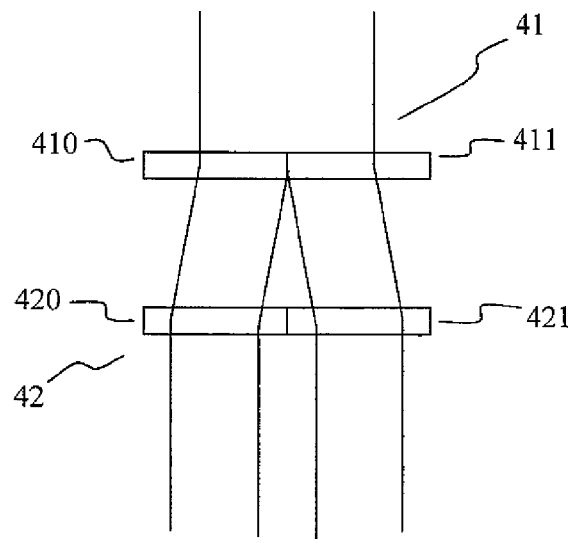
FIG. 15 shows a splitting optical system using two split gratings.
Figure 19:
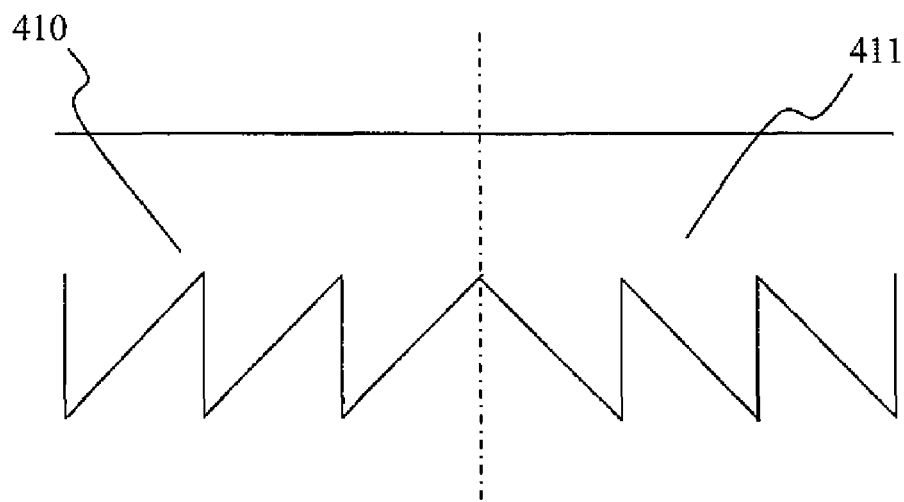
FIG. 19 shows the shape of a grating.
Figure 20:
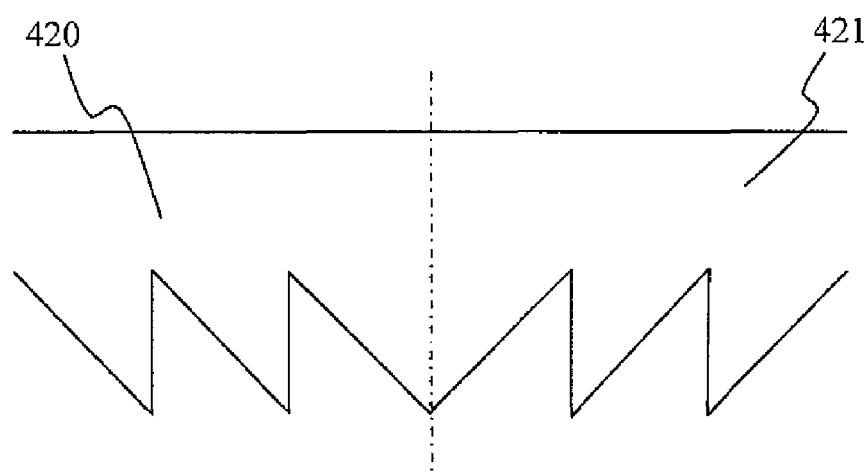
FIG. 20 shows the shape of another grating.

FIG. 15 shows an example of a splitting optical system that splits a beam into parallel beams using transmissive gratings 41 and 42. Each of the gratings 41 and 42 includes two regions where light is diffracted in different directions by the grating. Each grating has, in the corresponding two regions, grooves arranged at identical pitches and directed in the same direction as that of the dividing line. Moreover, the gratings 41 and 42 are shaped like sawteeth with a groove depth of $1/(n-1)$ that allows no zero-order beam to be generated. Here, n represents a refractive index of the grating, and the grating is assumed to be in the air. Even if the groove depth is multiplied by integers, no zero-order beam is generated. FIG. 19 shows the sawteeth shape of the grating 41. Since the shapes of such sawteeth in the regions 410 and 411 are inverted with respect to each other, light beams are diffracted symmetrically about the optical axis. Thereby, light incident on the two regions is emitted in different directions. FIG. 20 shows the sawteeth shape of the grating 42. Light enters the grating 42 from the top. The shape of the sawteeth in the region 421 is the same as that in the region 410, and the shape of the sawteeth in the region 420 is the same as that in the region 411. Accordingly, when two beams each having an angle to the optical axis after passing through the grating 41 are transmitted through the grating 42, the beams become light beams parallel to the optical axis with a gap therebetween.

Figure 16:
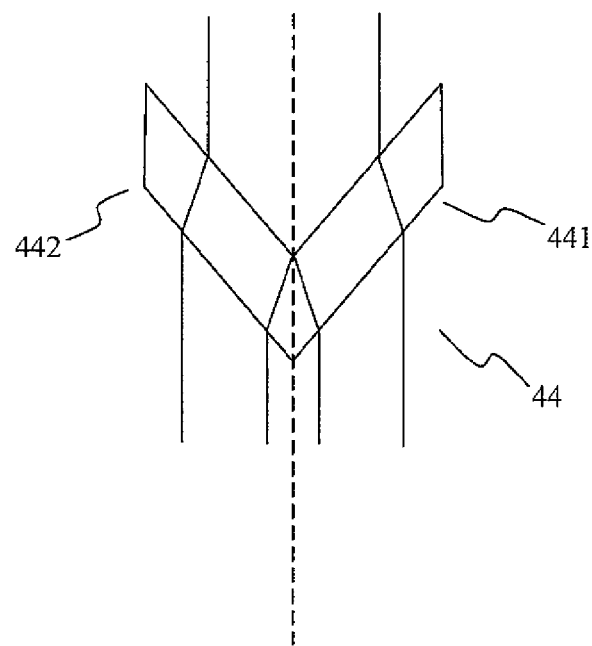
FIG. 16 shows a splitting optical system using two parallel plane tables.

FIG. 16 shows an example of a splitting optical system that uses parallel plane tables. A flat splitting element 44 includes two parallel plane tables 441 and 442. The parallel plane tables are inclined to the optical axis at the same angle, and positioned symmetrically about the optical axis. A ridge line formed by a joint portion between the two parallel plane tables perpendicularly intersects the optical axis, and the ridge line or a valley line formed by the joint portion between the parallel plane tables is positioned within a plane that includes the attenuation element. Parallel light entered from the top of the drawing is split into two at the position of the valley line, and thus-split light beams enter the different parallel plane tables. The parallel plane table made of transparent glass or plastic has a refractive index greater than that of air. Accordingly, upon entering the incident surface, light beams travel in such a way as to go away from the plane including the valley line and the optical axis. Then, at the emission surface, the light beams become beam parallel to the optical axis.

Next, the present invention will be described with reference to embodiments thereof.

First Embodiment

Figure 1:
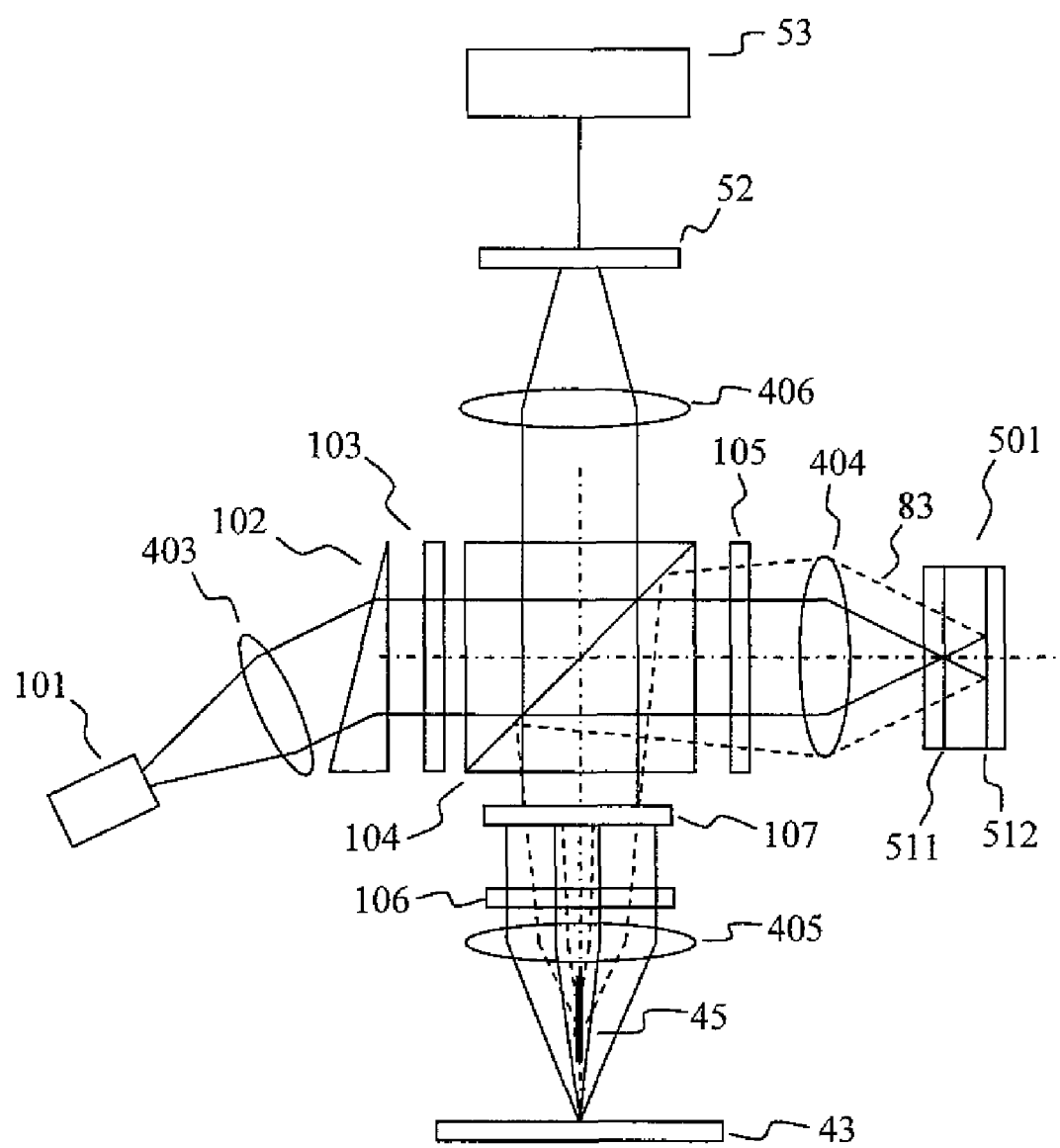
FIG. 1 shows one example of an optical system of an optical pickup device according to the present invention.
Figure 6:
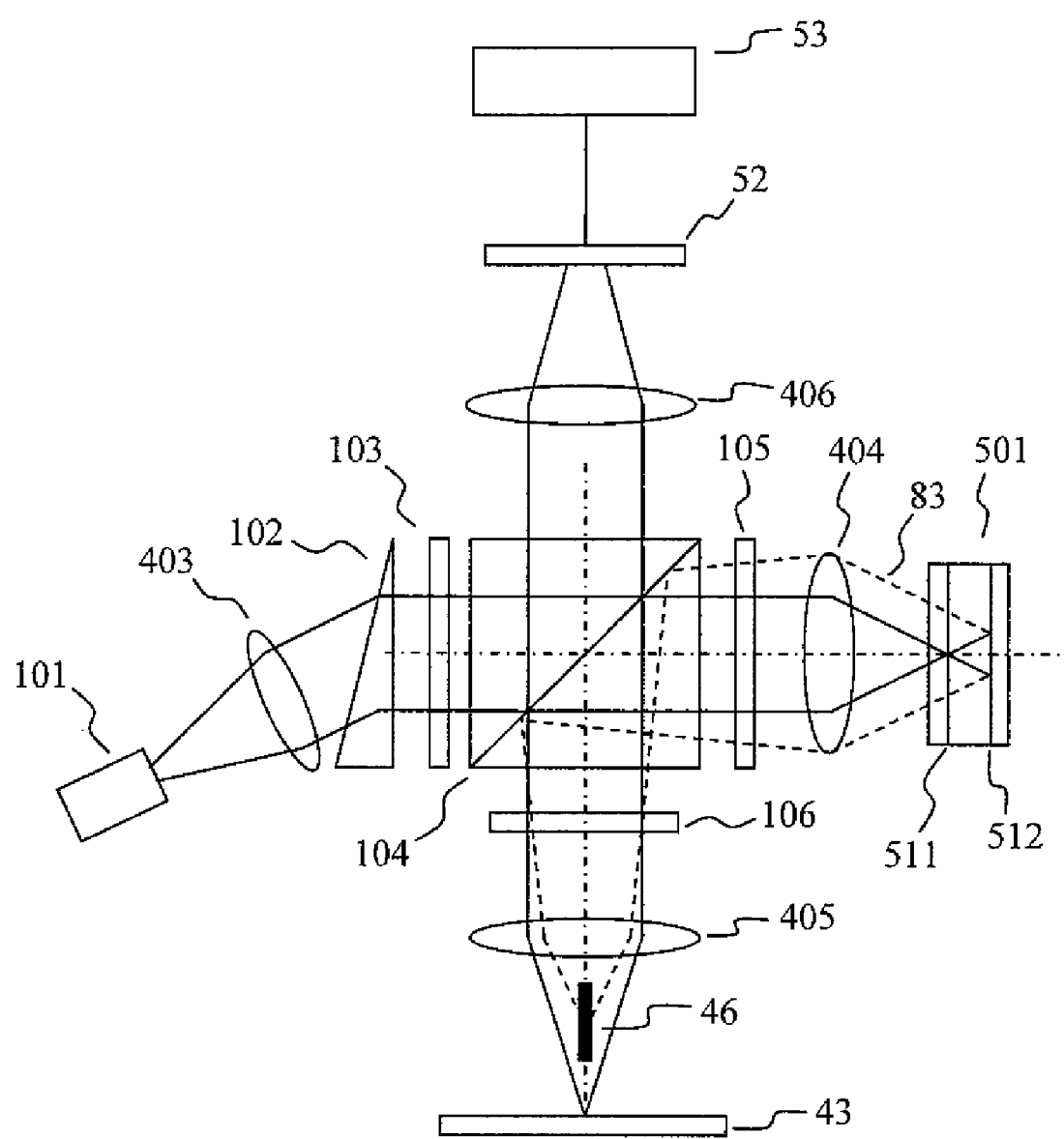
FIG. 6 shows an optical pickup optical system using an attenuation element that is provided on an optical axis.
Figure 7:
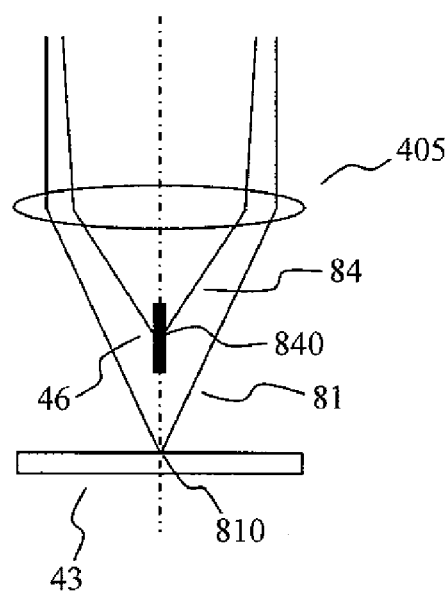
FIG. 7 shows a function of the attenuation element on reflected light from a layer located deeper than a target layer.
Figure 8:
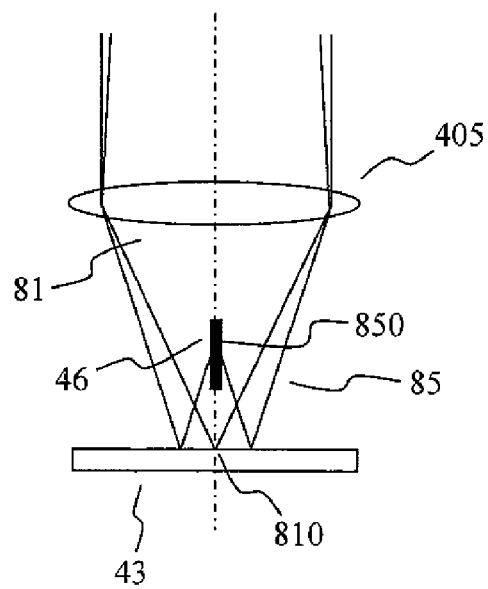
FIG. 8 shows a function of the attenuation element on reflected light from a layer located shallower than the target layer.
Figure 9:
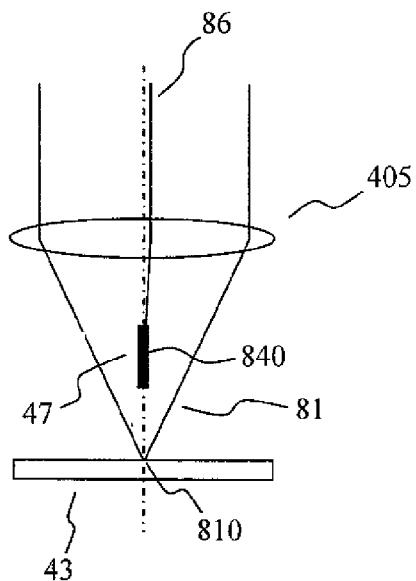
FIG. 9 shows that a light beam near the optical axis is blocked by the attenuation element.

FIG. 1 shows an optical system of an optical pickup device according to a first embodiment of the present invention. A splitting optical system 107 is inserted in the optical system shown in FIG. 6. Thereby, reflected light from a multi-layer disc 501 is converted into beams with a gap at a central portion. Reference numeral 45 denotes an attenuation element for which a grating is used. Reflected light from a target layer 511 of the multi-layer disc 501 forms a minimum spot on a reflection plate 43 without irradiating the attenuation element 45, and returns to a reflected light focusing lens 405. The reflected light is then emitted from the reflected light focusing lens 405 in the state of being split into parallel beams, and returns to the splitting optical system 107 to return to the normal non-split state. After being emitted from the splitting optical system 107, the reflected light from the target layer is transmitted through a polarized beam splitter 104 and a focusing lens 406 having astigmatism, and then detected by a photodetector 52. Meanwhile, reflected light from a layer other than the target layer irradiates the attenuation element 45, and accordingly cannot return to the reflected light focusing lens 405. Thus, the reflected light does not reach the photodetector 52, and no inter-layer crosstalk is generated. At the same time, the reflected light from the target layer passes through the attenuation element 45 with no light travelling near the optical axis. Accordingly, the intensity is not reduced with the attenuation element 45.

Figure 10:
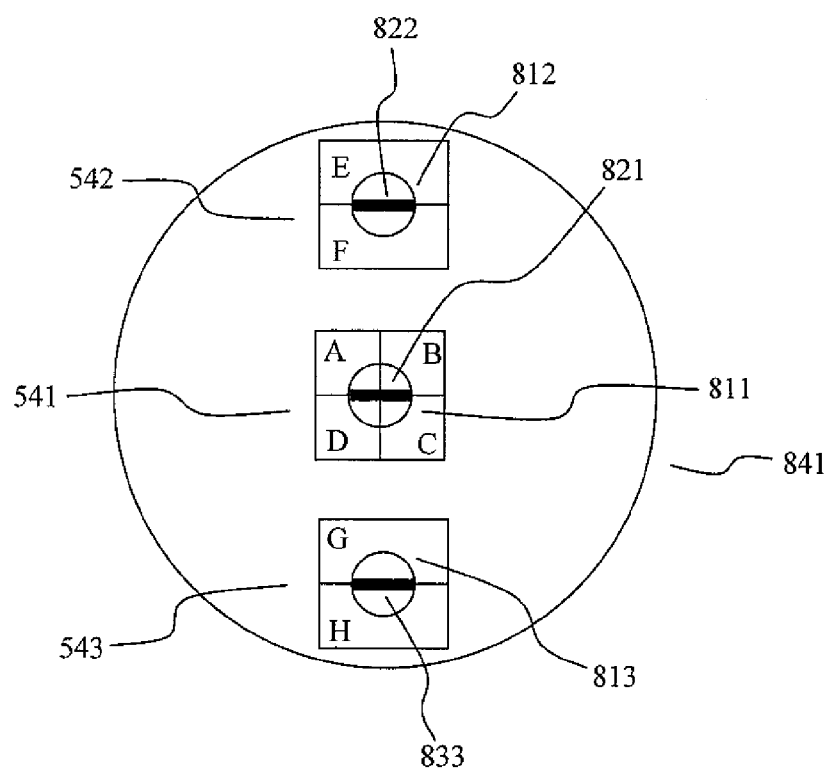
FIG. 10 shows distributions in quantity of a main light beam and sub-light beams on the detector, which have been blocked by the attenuation element.

The optical systems shown in FIGS. 14 to 16 can be used as the splitting optical system 107. A grating of the splitting optical system shown in FIG. 15 may be a polarization diffraction element. In this case, it is set such that the diffraction effect may be exerted only on a light beam which travels from the polarized beam splitter 104 to the splitting optical system 107, but not on a light beam which returns from a quarter wave plate 106 and which has a polarized direction differing by 90° from the original direction. Although a beam is detected in the split state, the quantities of light entering the respective split detectors (FIG. 10) are the same as those in a case where a beam is not split. Thus, a problem does not occur in an RF signal and a control signal. The use of the polarization diffraction grating is advantageous because the influence of the inclination of the reflection plate 43 and the positional shift in the optical axis direction, on the splitting element can be reduced.

Figure 5:
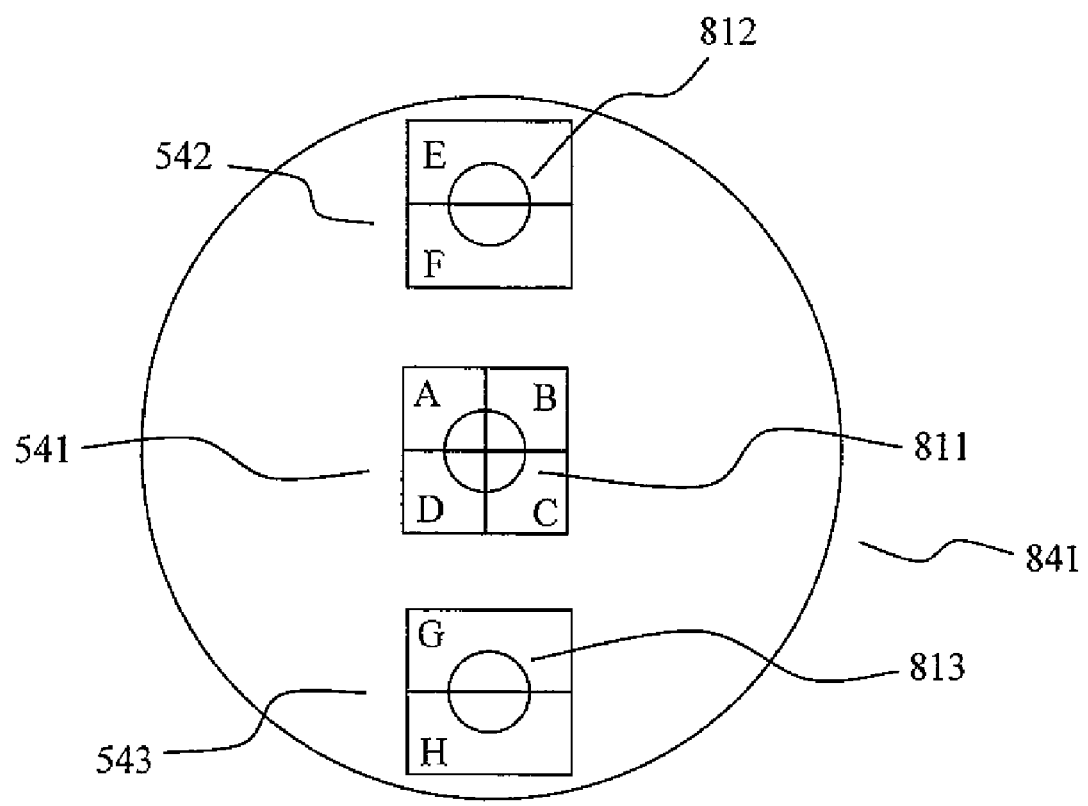
FIG. 5 shows the shape of a photodetector as well as positions of optical spots of reflected light from an optical disc and how the optical spots spread.
Figure 17:
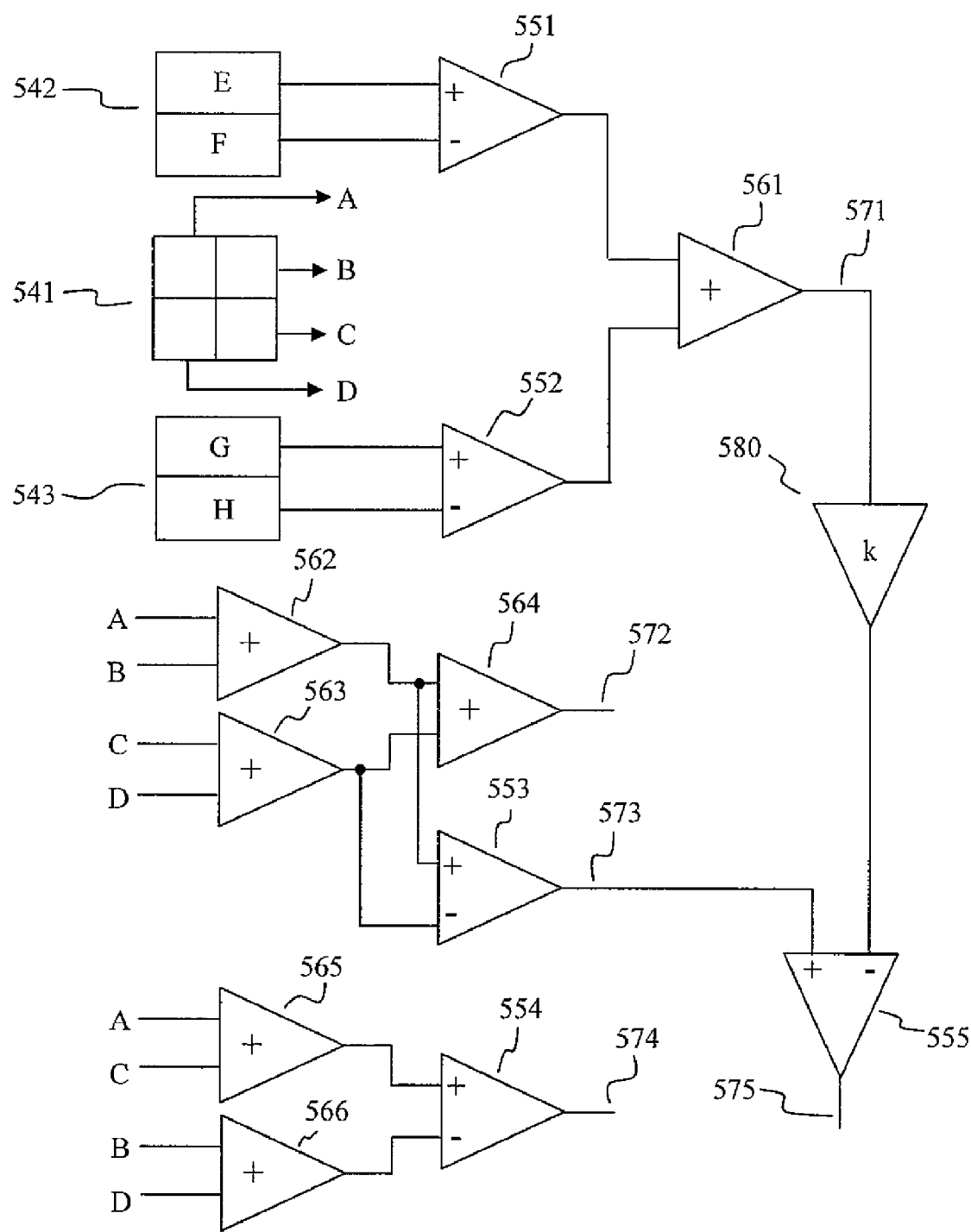
FIG. 17 schematically shows a signal processing circuit.

FIG. 17 shows an electronic circuit for processing signals. Photodetectors 541, 542 and 543 are identical to those shown in FIG. 5. The 4-split detector 541 detects a main light beam, and the 2-split detectors 542, 543 detect sub-light beams. Reference numerals 551 to 555 denote differential amplifiers. Reference numerals 561 to 566 denote adder circuits. Reference numeral 580 denotes an amplifier for multiplying a signal by k times, where a value of k is determined in consideration of the intensity ratio between the main light beam and the sub-light beams. A signal from each detector is amplified with a preamplifier, and is then processed with these electronic circuits to form a control signal or data signal. Signals A, B, C, and D outputted from the 4-split detector are added to form a signal 572 as the data signal. A signal 574 is an AF signal by the astigmatism method. A signal 573 is a push-pull signal from the main light beam, while a signal 571 is a sub push-pull signal from the sub-light beam. The signal 571 is amplified with the amplifier 580 by k times, and this amplified signal is processed, together with the push-pull signal 573 from the main light beam, with the differential amplifier 555 to become a TR signal 575.

According to the present embodiment, the quantity of light in a central portion of the main light beam is not reduced. Accordingly, the signal-to-noise ratio of an RF signal is not deteriorated. Inter-layer crosstalk can be also removed, and the RF signal is not mixed with stray light from a layer other than a target layer. Thus, a data signal with less error is obtained. The use of this method naturally reduces the phenomenon that a tracking error signal varies with the variation in layer interval. Specifically, a reflected main light beam from an adjacent layer and a reflected sub-light beam from a target layer for tracking interfere with each other, and the phase difference varies depending on the inter-layer interval. Thereby, a sub push-pull signal varies. Nevertheless, according to the present invention, the influence of reflected light from the adjacent layer can be reduced, and thus the variation of the tracking error signal is reduced. This allows more accurate controlling of laser beam irradiation positions, so that laser irradiation positions can be precisely determined during reading and writing. Thus, the signal quality is improved.

In the present embodiment, the polarization optical system is used. Alternatively, when a semiconductor laser has sufficient maximum output, it is possible to use an optical system in which in which an ordinary beam splitter is used in place of the polarized beam splitter 104 is replaced with an ordinary beam splitter and from which does not include the quarter wave plates 105, 106 are removed.

Second Embodiment

Figure 2:
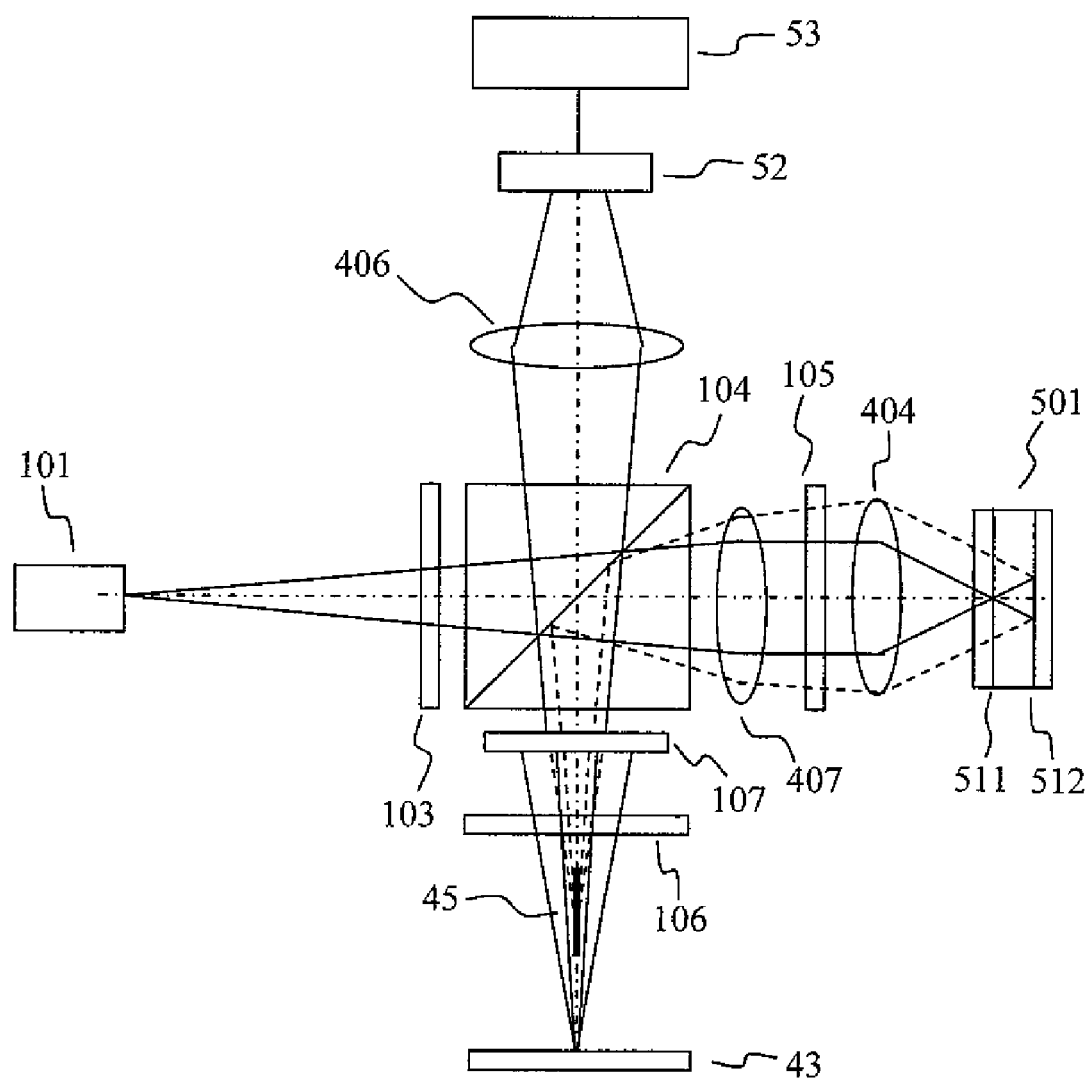
FIG. 2 shows another example of the optical system of the optical pickup device according to the present invention.
Figure 3:
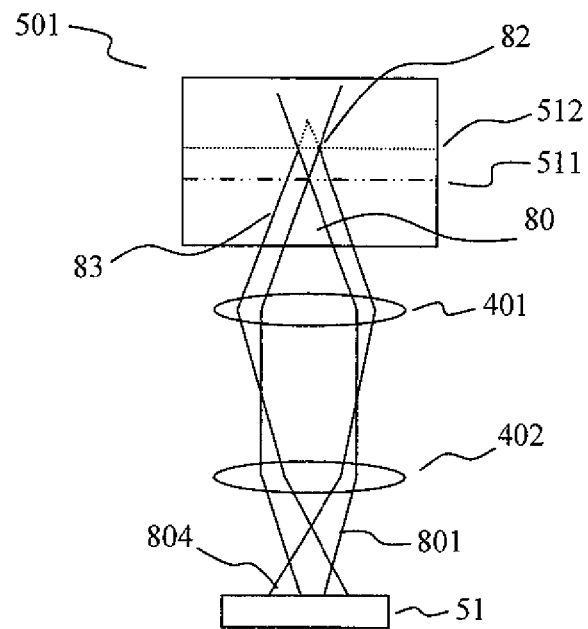
FIG. 3 shows influence of reflected light from an adjacent layer.
Figure 4:
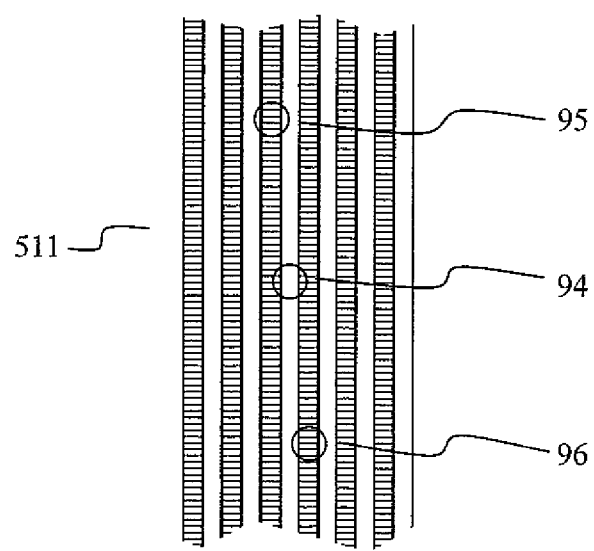
FIG. 4 shows a state where one main light beam and two sub-light beams irradiate a recording surface having grooves.

FIG. 2 shows an optical system of an optical pickup device according to a second embodiment of the present invention. In the present embodiment, a diffraction grating 103 and a polarized beam splitter 104 are provided closer to a semiconductor laser 101 than a collimator lens 407. Thereby, a laser beam emitted from the semiconductor laser 101 is transmitted through the polarized beam splitter 104 as divergent light, then collimated with the collimator lens 407, and enters a quarter wave plate 105. In the first embodiment, the diffraction grating 103 and the polarized beam splitter 104 are provided between the collimator lens 403 and the objective lens 404, and accordingly the focusing lens 405 is needed. However, in the second embodiment, an optical beam reflected from a reading target layer 511 of a multi-layer disc 501 is converted into convergent light, when passing through the collimator lens 407, as shown in FIG. 2. Accordingly, a focusing lens is not needed. Consequently, the effect of reducing the number of components is obtained.

The optical systems shown in FIGS. 14 to 16 can be used as a splitting optical system 107 as in the first embodiment. A grating of the splitting optical system shown in FIG. 15 may also be a polarization diffraction element as in the first embodiment. In the first embodiment, reflected light from the target layer 511 is emitted from the splitting optical system 107 as parallel light. Meanwhile, in the present embodiment, reflected light from the target layer 511 is emitted from the splitting optical system 107 as convergent light.

Third Embodiment

Figure 18:
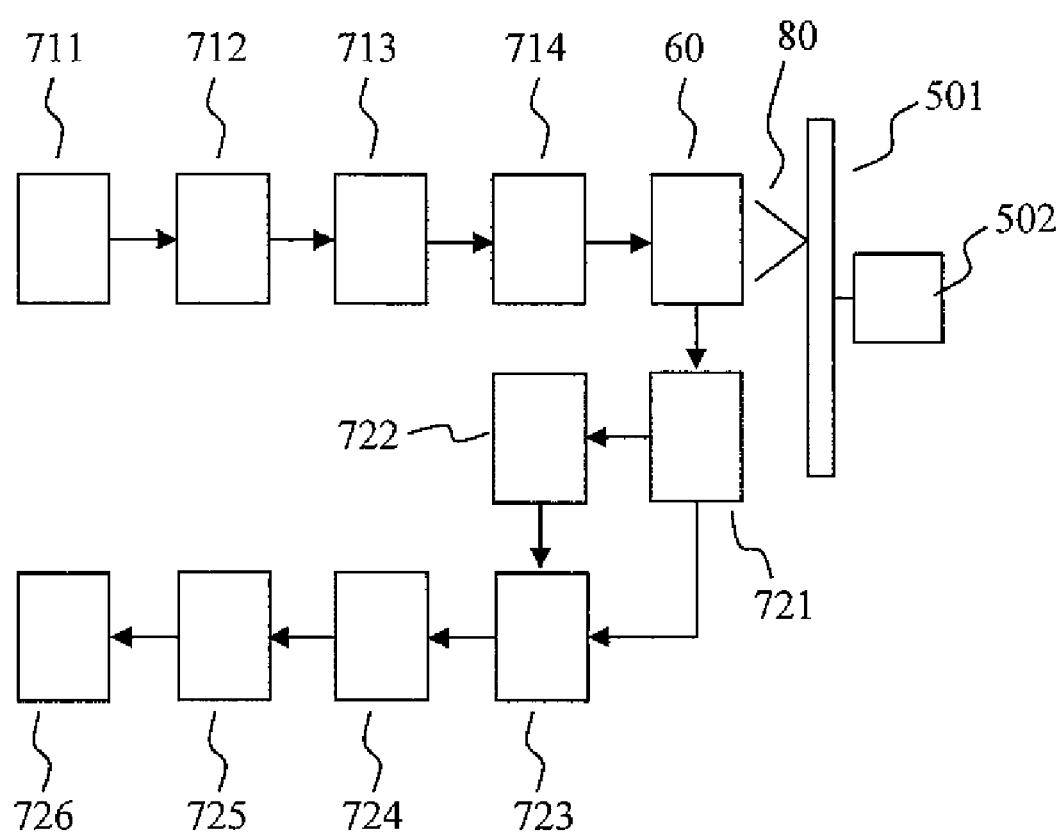
FIG. 18 shows one example of an optical disc drive apparatus using the optical pickup device according to the present invention.

FIG. 18 shows an embodiment of an optical disc drive apparatus capable of reducing variation in a sub push-pull signal (SPP). Circuits 711 to 714 are for recording data in a multi-layer optical disc 501. In the error correction encoding circuit 711, an error correction code is added to the data. The record encoding circuit 712 modulates the data with the 1-7PP system. The record compensating circuit 713 generates a pulse for writing data suitable for mark length. On the basis of a pulse train thus generated, the semiconductor laser driving circuit 714 drives a semiconductor laser in an optical pickup 60 and modulates a laser beam 80 emitted from an objective lens. A phase changing film is formed on the optical disc 501 driven to rotate with a motor 502, and this film is heated with the laser beam. When rapidly cooled, the film changes into an amorphous state. Meanwhile, when gradually cooled, the film changes into a crystalline state. The reflectivity is different between these two states, and accordingly a mark can be formed. High frequency superimposition for lowering the coherency of a laser beam is not implemented in a writing condition. Thereby, reflected light from an adjacent layer and reflected light from a target layer are likely to interfere with each other. Accordingly, if no measure is taken for reducing variation in SPP, a failure occurs such as tracking error and erasing data in an adjacent track. In the present embodiment, any of optical pickups described in the first and second embodiments is employed as the optical pickup 60, and thus a tracking failure does not occur even in a multi-layer disc.

Circuits 721 to 726 are for reading data. The equalizer 721 improves the signal-to-noise ratio near the shortest mark. The signal in this area is inputted to the PLL circuit 722, and thereby a clock is extracted. Moreover, the data signal processed by the equalizer 721 is converted into a digital signal by the A-D converter 723 in the timing of the extracted clock. The PRML (Partial Response Maximum Likelihood) signal processing circuit 724 performs the Viterbi decoding. The record decoding circuit 725 decodes the signal on the basis of the modulation rule of 1-7PP system. The error correction circuit 726 restores the data.

INDUSTRIAL APPLICABILITY

According to the present invention, the quantity of light in a central portion of an RF signal is prevented from being reduced in an optical pickup device to which a measure for inter-layer crosstalk is taken. Thereby, the signal-to-noise ratio of the RF signal can be improved. In concert with the effect of removing crosstalk from another layer, the quality of a data signal can be kept with less error.

EXPLANATION OF REFERENCE NUMERALS 43 reflection plate
45 grating attenuation element
46 attenuation element
52 detector
53 signal processing circuit
101 semiconductor laser,
103 diffraction grating
104 polarized beam splitter
105 quarter wave plate
106 quarter wave plate
107 splitting optical system
404 objective lens
405 reflected light focusing lens
406 focusing lens having astigmatism
501 multi-layer disc
541 4-split detector
542 2-split detector
543 2-split detector
81 reflected light from target layer
811 main light beam spot
812 sub-light beam spot
813 sub-light beam spot
821 dark line formed by blocking element
841 optical spot formed by main light beam from adjacent layer

What is claimed is:

1. An optical pickup device comprising:
    a laser light source;
    an irradiated light focusing optical system for focusing laser light from the laser light source on a recording layer of a multi-layer optical information storage medium; and
    a detection optical system for detecting, among reflected light, light reflected from the recording layer of the multi-layer optical information storage medium, wherein
    the detection optical system includes:
        a splitting optical system for splitting the reflected light from the recording layer into parallel light bundles respectively located on two sides of an optical axis so that the light bundles thus split do not pass through the optical axis;
        a reflected light focusing lens for focusing the reflected light thus split by the splitting optical system;
        a reflection surface provided at a minimum spot position of the reflected light from the recording layer among the reflected light focused by the reflected light focusing lens;
        an attenuation element provided between the reflected light focusing lens and the reflection surface in such a way as to include the optical axis and used for attenuating the quantity of reflected light from an adjacent layer other than the recording layer; and
        a photodetector for detecting the reflected light, and
    the reflected light reflected by the reflection surface is detected on the photodetector.

2. The optical pickup device according to claim 1, wherein the attenuation element is in the form of flat plate, and provided at a position on the optical axis through which the reflected light from the recording layer does not pass and which overlaps a position at which the reflected light from the adjacent layer is focused by the reflected light focusing lens.

3. The optical pickup device according to claim 1, wherein the splitting optical system includes two biprisms disposed along the optical axis.

4. The optical pickup device according to claim 1, wherein
    the splitting optical system includes two grating elements disposed along the optical axis,
    the two grating elements are each separated by a plane that includes the optical axis,
    each of the two grating elements has grooves which are directed in a same direction, which are formed to have a depth to suppress a zero-order beam and which are shaped in the form of sawteeth, and
    the gratings are symmetric about the plane that includes the optical axis.

5. The optical pickup device according to claim 1, wherein an optical surface of the splitting optical system includes:
    first two planes having a same angle to the optical axis with a straight line as a ridge line, the straight line being perpendicular to the optical axis within a plane that includes the attenuation element; and
    second two planes positioned in parallel to the first two planes in a direction of the optical axis.

6. An optical pickup device comprising:
    a laser light source;
    an irradiated light focusing optical system for focusing laser light from the laser light source on a recording layer of a multi-layer optical information storage medium; and
    a detection optical system for detecting, among reflected light, light reflected from the recording layer of the multi-layer optical information storage medium, wherein
    a beam splitter and an objective lens are provided in an optical path of the irradiated light focusing optical system,
    the irradiated light focusing optical system and the detection optical system share the beam splitter and the objective lens,
    the irradiated light focusing optical system allows the laser light from the laser light source to pass through the beam splitter as divergent light,
    the detection optical system includes:
        a splitting optical system for splitting the reflected light from the recording layer into light bundles respectively located on two sides of an optical axis so that the light bundles do not pass through the optical axis immediately after the splitting and gradually converge on the optical axis;
        a reflection surface provided at a minimum spot position of the reflected light from the recording layer among the reflected light having passed through the splitting optical system;
        an attenuation element provided between the splitting optical system and the reflection surface in such a way as to include the optical axis and used for attenuating the quantity of reflected light from an adjacent layer other than the recording layer; and
        a photodetector for detecting the reflected light, and
    the reflected light reflected by the reflection surface is detected on the photodetector.

7. The optical pickup device according to claim 6, wherein the attenuation element is in the form of flat plate, and provided at a position on the optical axis through which the reflected light from the recording layer does not pass and which overlaps a position at which the reflected light from the adjacent layer is focused.

8. The optical pickup device according to claim 6, wherein the splitting optical system includes two biprisms disposed along the optical axis.

9. The optical pickup device according to claim 6, wherein the splitting optical system includes two grating elements disposed along the optical axis, the two grating elements are each separated by a plane that includes the optical axis, each of the two grating elements has grooves which are directed in a same direction, which are formed to have a depth to suppress a zero-order beam and which are shaped in the form of sawteeth, and the gratings are symmetric about the plane that includes the optical axis.

10. The optical pickup device according to claim 6, wherein an optical surface of the splitting optical system includes:

first two planes having a same angle to the optical axis with a straight line as a ridge line, the straight line being perpendicular to the optical axis within a plane that includes the attenuation element; and second two planes positioned in parallel to the first two planes in a direction of the optical axis.

\* \* \* \* \*